US005720096A

United States Patent [19]
Dorsey

[11] Patent Number: 5,720,096
[45] Date of Patent: Feb. 24, 1998

[54] POWER TOOL WITH LOCKING FENCE

[75] Inventor: A. Nelson Dorsey, Sykesville, Md.

[73] Assignee: Black & Decker Inc., Newark, Del.

[21] Appl. No.: 579,052

[22] Filed: Dec. 21, 1995

Related U.S. Application Data

[63] Continuation of Ser. No. 53,935, Apr. 26, 1993, abandoned.

[51] Int. Cl.[6] .................................................. B26D 7/02
[52] U.S. Cl. ........................... 29/559; 83/452; 83/458; 83/462; 83/468.3; 83/468.7; 83/471.2; 83/581; 269/204; 269/258; 269/303
[58] Field of Search ......................... 83/452, 467.1, 83/468.1, 468.2, 468.3, 468.7, 471.2, 581, 457, 462, 464, 466, 458, 471.3, 477, 490; 269/181, 204, 258, 303, 315, 319, 99, 100, 305; 29/559

[56] References Cited

U.S. PATENT DOCUMENTS

| 159,573 | 2/1875 | Hempel | 269/258 X |
|---|---|---|---|
| 381,752 | 4/1888 | Beach . | |
| 416,244 | 12/1889 | Weller | 269/100 X |
| 447,903 | 3/1891 | Putnam . | |
| 1,018,699 | 2/1912 | De Smith | 269/305 X |
| 1,057,378 | 3/1913 | Dunn | 269/305 X |
| 1,491,184 | 4/1924 | Backert | 269/315 X |
| 1,825,104 | 9/1931 | Staeheli | 83/471.2 |
| 2,452,426 | 10/1948 | Blaske | 269/204 X |
| 2,502,124 | 3/1950 | Bray | 269/258 X |
| 2,601,878 | 7/1952 | Anderson . | |
| 2,785,709 | 3/1957 | Shepp | 269/258 X |
| 2,787,301 | 4/1957 | Anderson . | |
| 2,799,305 | 7/1957 | Groehn . | |
| 3,124,181 | 3/1964 | Clemans . | |
| 3,812,751 | 5/1974 | Lewis . | |
| 3,901,498 | 8/1975 | Novak . | |
| 4,002,094 | 1/1977 | Erickson et al. | 83/471.3 |
| 4,078,302 | 3/1978 | Fok et al. . | |
| 4,206,910 | 6/1980 | Biesemeyer . | |
| 4,817,693 | 4/1989 | Schuler . | |
| 4,934,233 | 6/1990 | Brundage et al. . | |
| 4,934,678 | 6/1990 | Bernier . | |
| 5,016,510 | 5/1991 | Gardner | 83/471.2 |
| 5,116,249 | 5/1992 | Shiotani et al. . | |
| 5,201,863 | 4/1993 | Peot | 83/581 X |
| 5,483,858 | 1/1996 | Chen | 84/464 |

FOREIGN PATENT DOCUMENTS

| 0224653 | 10/1989 | European Pat. Off. . | |
|---|---|---|---|
| 7420476 | 9/1974 | Germany . | |
| 3327063 | 6/1984 | Germany . | |
| 3306743 | 8/1984 | Germany . | |
| 3444795 | 4/1986 | Germany . | |
| 3503299 | 8/1986 | Germany . | |
| 3636050 | 4/1988 | Germany . | |
| 4025440 | 2/1991 | Germany . | |
| 4225596 | 2/1993 | Germany . | |
| 217694 | 6/1924 | United Kingdom | 269/258 |
| 591212 | 8/1947 | United Kingdom . | |

*Primary Examiner*—Rinaldi I. Rada
*Assistant Examiner*—Clark F. Dexter
*Attorney, Agent, or Firm*—Charles E. Yocum; Adan Ayala

[57] ABSTRACT

A locking fence for a power tool such as a chop saw, or for a work surface of a workbench, is capable of being moved to a selected location on the chop saw base or work surface and oriented at a selected angular orientation relative to the chop saw blade. The fence is locked simultaneously in such location and orientation when an operator rotates a cam actuator to lift a first clamping member away from the fence, which in turn draws a second clamping member into clamping engagement with the underside of a workpiece support of the base, and which further forces a cam portion of the actuator against the fence. No tools are required to lock or unlock the fence. The fence defines an arcuate slot for enabling the angular orientation to be adjusted. The arcuate slot is maintained in juxtaposition to a slot formed in the work surface for enabling movement of the fence to its selected location on the workpiece support or work surface, by linking screws linking the slots.

12 Claims, 6 Drawing Sheets

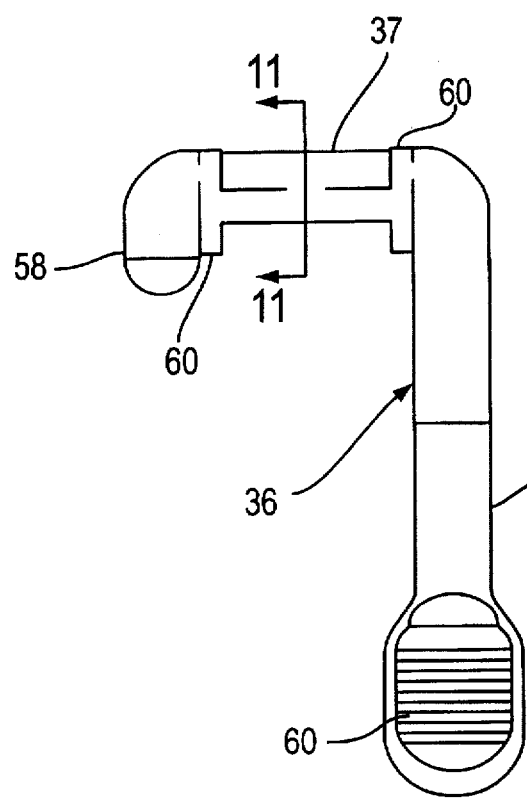
FIG. 10
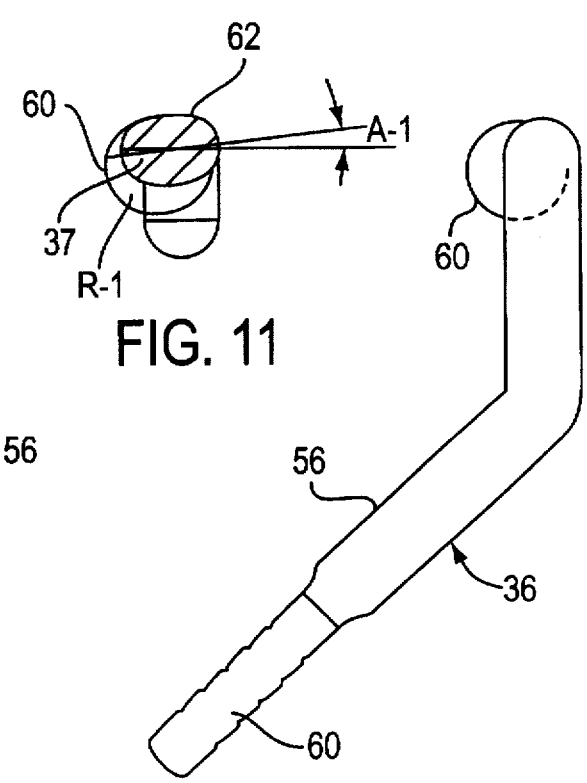
FIG. 11
FIG. 12

POWER TOOL WITH LOCKING FENCE

This application is a continuation of application Ser. No. 08/053,953, filed Apr. 26, 1993, now abandoned.

FIELD OF THE INVENTION

The invention relates to fences for power tools and to a method for simultaneously locking the fence at a predetermined location on the power tool base and at a predetermined angular orientation relative to the cutting implement. The invention is particularly directed to an adjustable fence for power saws, such as chop saws, miter saws and table saws, but is also adapted for use with other power tools, such as routers, and can also be used on a worktable or workbench having a work surface.

BACKGROUND OF THE INVENTION

Various mechanisms and methods for clamping an adjustable fence to the base of a power saw have been in use for many years. However, these conventional mechanisms and methods have either required the use of tools to make the adjustments and to lock or unlock the mechanism, or they have required the operator to perform two or more locking steps to lock the fence in place. For example, one of such conventional arrangements, requires the operator to actuate one lock to clamp the fence in a predetermined angular orientation relative to the saw blade or cutting implement, and yet another operation to clamp the fence at a predetermined location on the base. Both of these disadvantages of the conventional mechanism and methods cost extra expenditures of operator's time.

SUMMARY OF THE INVENTION

It has been realized that there is a need for a fence for a power tool, for example a power saw, which does not require any tools, thereby eliminating the chance that the fence cannot be adjusted if the required tools are missing. It has also been realized that there is a need for a way to lock the fence into position on the base or the workpiece support of the power tool, or on a work surface of a worktable or workbench, by a single actuation.

An object of the present invention is to be able to lock the fence into place such that its angular orientation and location on the base or work surface can be fixed with a single actuation.

It is a particular object of the preferred embodiments of the invention to provide a fence in which a single motion by the operator can clamp or lock the fence in its (i.e., selected) predetermined angular orientation relative to the saw blade and at a particular selected location on the base, simultaneously. A feature by which the above objects can be obtained is by providing a cam actuator which, when actuated by the operator, lifts a first or upper clamping member away from the fence while forcing the cam against the fence, and simultaneously drawing a second clamping member upward against the underside of the workpiece support, therefore tightly sandwiching the cam actuator against the fence and the second or lower clamping member tightly against the underside of the work support or work surface. A preferred feature is to form the first clamping member into an inverted "U"-shaped strap which straddles the cam portion of an actuating lever, and to connect the strap to the second or lower clamping member by two threaded bolts, (one each located on either side of the "U"-shaped portion) through the strap, the fence and into threaded engagement with the second clamping member.

Yet another preferred feature is to provide a fence system having an "L"-shaped fence member including a base portion which defines an arcuate slot to enable adjustment of the angular orientation of the fence on the work surface, the arcuate slot being in juxtaposition with guiding means formed in the work surface for enabling the fence to be moved to a predetermined location on the work surface, the arcuate slot being maintained in juxtaposition to the guiding means by means for linking the arcuate slot and the guiding means, and further including locking means operatively associated with the linking means for locking the fence both in its adjusted angular orientation and in its predetermined location on the work surface. The guiding means includes a slot formed in the work surface, which work surface slot may be formed in a straight line in alignment with a slot for guiding a moveable vise member. The linking means may include the bolt noted above, connecting the first clamping member via the work surface slot, to the second clamping member, and the other bolt noted above, connecting the first clamping member, via the fence arcuate slot and the work surface slot, to the second clamping member. The locking means may include an actuator having a cam portion and a lever portion such that rotation of the lever portion cam the first clamping member upward as noted above, to draw the bolts upwardly, thereby drawing the second clamping member tightly against the underside of the work surface.

Another preferred feature is to provide a protrusion on the upper surface of the second clamping member mating with the work surface guiding means, so that the fence subassembly can be moved back and forth along the through-slot. A vise subassembly is also provided, which includes a vise jaw which is swivelly mounted on a pin which coacts with another through-slot formed in the work support in alignment with the fence or work surface through-slot. This now permits the workpiece to be mounted between the fence and the vise jaw such that the fence and the vise jaw can be moved toward and away from the workpiece, and yet be maintained in opposing alignment. Finally, both the bolts and a detent member are located in the lower clamping member through the upper portion that is configured to mate with the through-slot. The detent system includes piloting the detent member in two coaxial diameters along a vertical center line within the second clamping member. A rounded upper end of the pin coacts with any one of several depressions formed in an annular array on the underside of the fence, thereby providing means for holding the fence at any one of a number of frequently-used angular orientations, such as 30°, 45° and the like.

Other objects, features and advantages of the present invention will become more fully apparent from the following detailed description of the preferred embodiments, the appended claims and the accompanying drawings.

BRIEF DESCRIPTION OF THE DRAWINGS

In the accompanying drawings, in which like reference characters in the same or different Figures indicate like parts:

FIG. 10 is a top plan detail view of the actuator of the present invention shown in FIG. 2;

FIG. 11 is an elevational sectional view taken along line 11—11 of FIG. 10, showing the inclination over-center of the cam portion relative to the regular orientation of the cam lever or actuator;

FIG. 12 is an elevational view of the actuator shown in FIG. 10; and

DETAILED DESCRIPTION OF THE PREFERRED EMBODIMENTS

Figure 1:
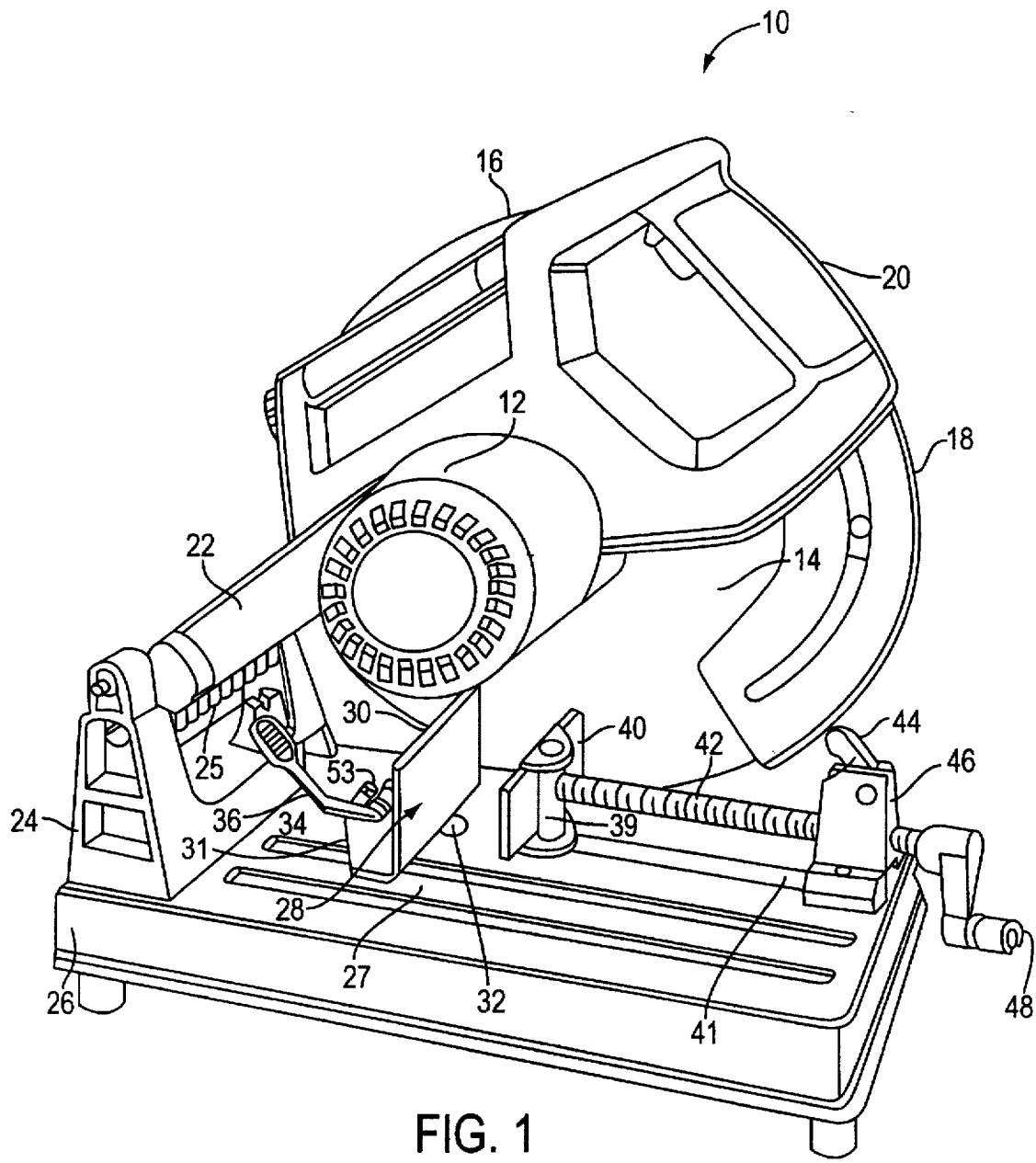
FIG. 1 is a left front perspective of a chop saw embodying the locking fence of the present invention.
Figure 2:
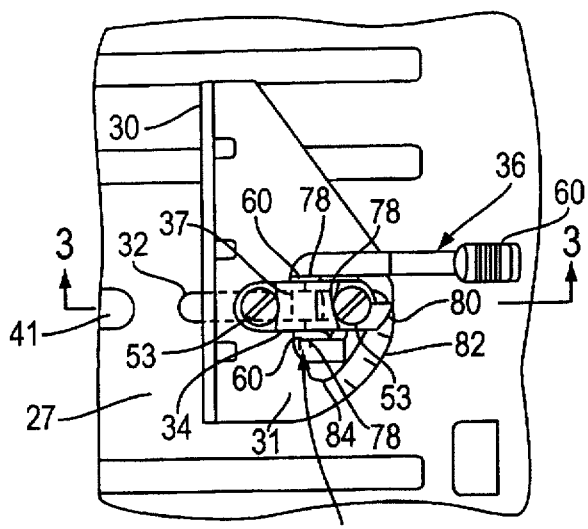
FIG. 2 is an enlarged detail view, in plan, of the fence of the present invention and a portion of the workpiece support.
Figure 3:
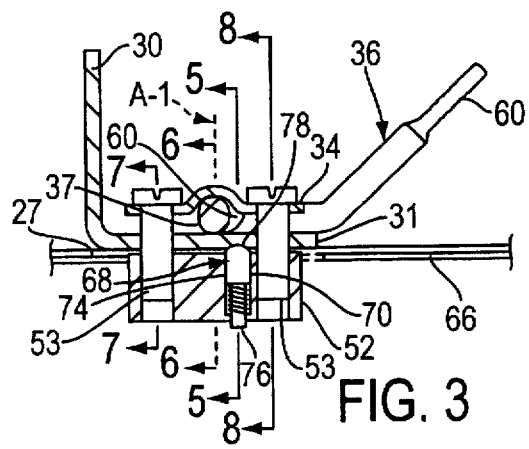
FIG. 3 is an elevational sectional view, taken along line 3—3 of FIG. 2, showing the actuator in the locking position.
Figure 4:
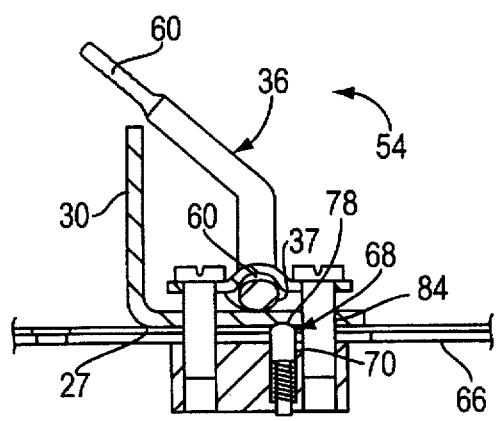
FIG. 4 is the same as FIG. 3, but showing the actuator in the unlocked position.
Figure 5:
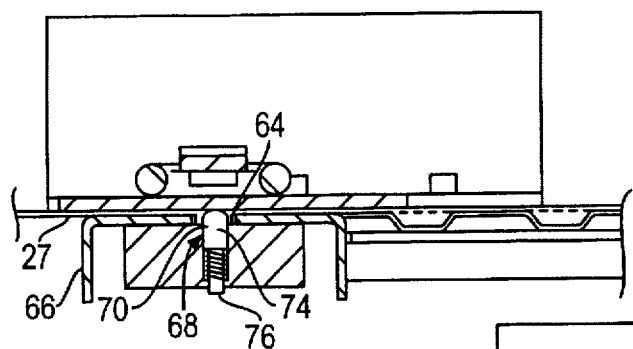
FIG. 5 is an elevational sectional view taken along line 5—5 of FIG. 3.
Figure 6:
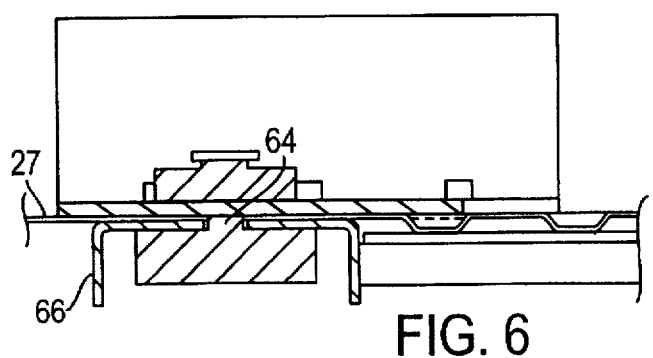
FIG. 6 is an elevational sectional view taken along line 6—6 of FIG. 3.
Figure 7:
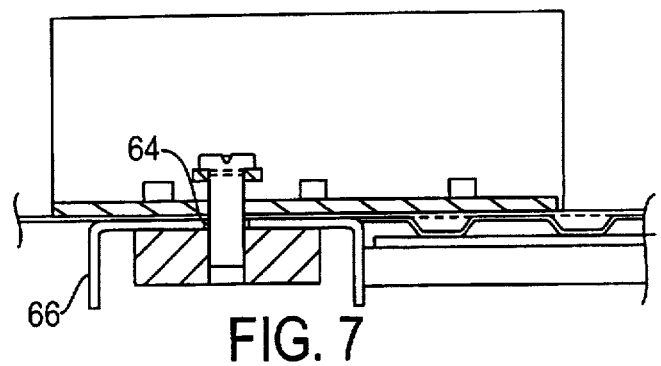
FIG. 7 is an elevational sectional view taken along line 7—7 of FIG. 3.
Figure 8:
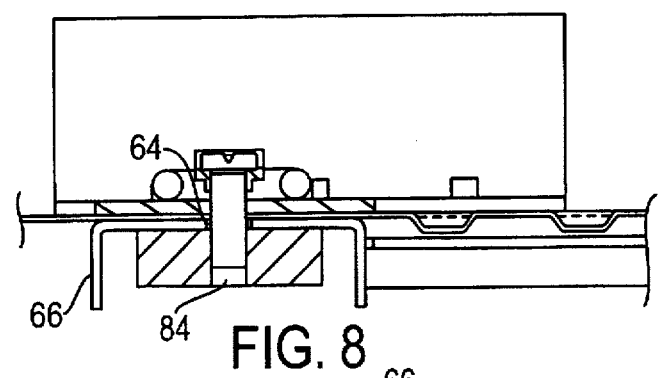
FIG. 8 is an elevational sectional view taken along line 8—8 of FIG. 3.
Figure 9:
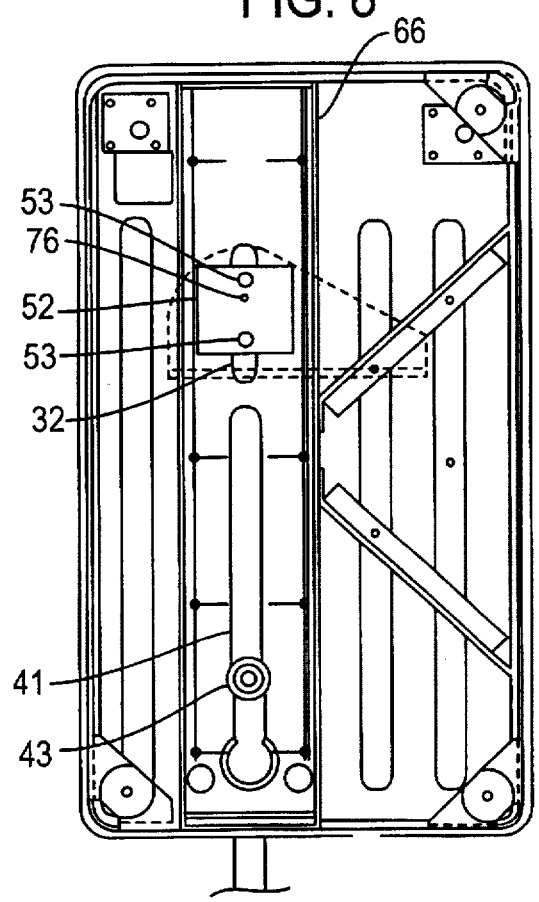
FIG. 9 is a bottom plan view of the base of the chop saw of the present invention, illustrating the relative positions of the second clamping member and the fence (shown in phantom) and the vise jaw, the fence and vise through-slots being shown in alignment.

With reference to FIGS. 1 and 2, the power tool with locking fence of the present invention is shown generally as 10, and in the preferred embodiment is referred to as a "chop saw". A chop saw is often used to cut off pieces of metal from items like angle iron and pipe, and is frequently found at construction job sites. Chop saw 10 includes a motor field case 12 containing a motor (not shown) which drives a blade 14. A stationary guard 16 covers a portion of the blade 14; a movable guard 18 telescopes over the stationary guard. A handle 20 is located between the field case 12 and the stationary guard 16, and is connected to an arm 22. The arm 22 is pivotally mounted on an arm support 24 and is normally biased in the upward position by return spring 25. The arm support 24 is mounted on base 26, on a workpiece support 27 or work surface on which is also slideably and rotatably mounted fence subassembly 28. The fence subassembly 28 includes a workpiece-engaging portion 30 which is guided along the base 26 via a slot formed in the work surface 27 (fence through-slot 32). Metal strap or first clamping member 34 restrains a cam lever or actuator 36 against a horizontal or base portion 31 of fence 28. The first clamping member 34 is threadedly bolted to a second clamping member 52 via two bolts 53 (see FIGS. 3–8) and rotation of the actuator 36 locks or unlocks the fence subassembly 28, as the operator desires. Again referring to FIGS. 1 and 2, a swivelling vise jaw 40 coacts with fence 28 to clamp a workpiece in a desired angular orientation relative to blade 14. In FIG. 1 the operator has selected the angular orientation to be 90° to the blade. Moreover, the fence subassembly 28 and vise jaw 40 can be rotated along their respective "Y" axes to achieve a desired angle such as, for example, 30° or 45°, so that the chop saw can make a miter cut. The vise jaw 40 is advanced to a clamping position rotation of vise screw 42. The vise jaw 40 pivots about jaw bolt or pin 39, which is sized to slideably advance or retract in vise through-slot 41, and is slideably held in place by washer 43 (FIG. 9). Returning again to FIG. 1, a vise latch 44 is mounted in a conventional way on a latch support 46 to latch the vise screw 42 in its clamping position. The clamping force can be augmented by rotation of vise handle 48, which is fixedly connected to vise screw 42. With reference now to FIGS. 2–4, the actuator or cam lever 36 includes a cam portion 37 which is shown in FIG. 3 canted to an over-center angle A-1 at approximately 7° over-center, although any angle past center will lock. The resultant force created by the over-center mounting arrangement is enough to retain the actuator 36 in its locking position as shown in FIG. 3. In the position as shown in FIGS. 2 and 3, the cam portion 37 has forced the first clamping member 34 away from the fence base portion 31, thereby drawing up bolts 53 which are threadedly connected to second, or lower, clamping member 52. This in turn causes second clamping member 52 to clamp against the underside of workpiece support 27. Inasmuch as rotation of the cam portion 37 has also forced actuator 36 against the fence base portion 31, the fence workpiece-engaging portion 30 is thereby locked into the position and angular orientation desired by the operator. The locking structure thus includes a sandwich of first clamping member 34, actuator cam portion 37, fence base portion 31, workpiece support or work surface 27 and second clamping member 52, all held in place by standard bolts 53. The fence, first clamping member and chop saw base can preferably be formed of cold-rolled steel. The second or lower clamping member can be formed of powdered metal, and the actuator is preferably cast high-carbon alloy steel, but may also be forged or machined.

Referring to FIG. 4, when it is desired to unlock the fence subassembly 28, the operator rotates the actuator 36 counterclockwise, as shown by arrow 54 in FIG. 4. This allows second clamping member 52 to relax its engagement with work support 27 and the clamping "sandwich" is unlocked, allowing the fence subassembly 28 to be free to move on the work support 27.

Now with respect to FIGS. 2, 5–8 and 10–12, the structure of the actuator 36 includes cam portion 37, a lever portion 56 and a turn-back portion 58. Two annular guide disks 60 of radius "R-I" are formed at both ends of cam portion 37. These guide disks 60 coact with the side edges of first clamping member 34 (see FIG. 2) to keep the actuator 36 in alignment with the first clamping member 34 and fence base portion 31 throughout the entire range of rotation of the actuator 36. Turn-back portion 58 serves to further retain the actuator in place and to provide additional bearing surface against the fence base portion 31. A serrated finger-grip 61 formed at an end of the actuator 36 on an arm portion permits grasping by the operator. Note in FIGS. 10, 11 and 12 that the cam portion is over-center by angle A-1, and that at this angle, the parts of the guide disks 60 and the cam portion 37 which engage the first clamping member 34 are coextensive, as at 62 in FIG. 11.

A means for guiding the fence subassembly 28 along work surface or work support 27 so that its position may be adjusted on the work support is shown in FIGS. 5–9. As shown in FIGS. 5–8, a raised portion or slot-follower 64 is formed on the second clamping member and is configured to slide in, and be guided by, fence through-slot 32. Preferably the raised portion 64 extends the length of the second clamping member 52. This assists in stabilizing the second clamping member 52, and thus the fence workpiece-engaging portion 30. The two threaded bolts 53 are connected to the second clamping member 52 on each side of its inverted "U"-shaped portion and into the raised portion. This provides uniform clamping to the fence subassembly "sandwich". Note in FIG. 9 that the centerlines of the fence and vise through-slots 32, 41 are aligned. Still referring to FIG. 9, note that a similarly-slotted reinforcing bracket 66 is provided for the track of the moving vise jaw 40 and fence subassembly 28, and is mounted so that its slots are aligned with slots 41 and 32. For purposes of simplification, similar reference numerals (32', 41') are used for the slots in the reinforcing bracket 66 as are used for the corresponding slots in the workpiece support 27. The reinforcing bracket 66 assists in preventing twisting and deformation of the workpiece support 27 during the clamping and working operations.

Another feature of the present invention is a detent system shown in FIGS. 2–5 generally as 68. The detent system 68 includes a detent member or pin 70 having an upper portion 72 having a diameter D-1 and a coaxial lower portion 74 having a smaller diameter 76, both portions being piloted for sliding movement in corresponding bores formed through the raised or slot-follower portion 64 of second clamping member 52. The detent upper portion 72 is engageable with any one of an annular array of detent recesses 78 formed in the underside of the fence base portion 31; three such recesses are shown in phantom in FIG. 2. This permits the fence workpiece-engaging portion to be held in any one of a number of frequently-used angular orientations, such as 30° and 45°. As shown in FIG. 2, to further assist in selecting the desired angular orientation of the workpiece-engaging portion 30 of the fence subassembly, a pointer 80 is formed on one end of the first clamping member 34 and coacts with angle indicia 82 formed on an arcuate portion of the fence base portion 31. An annular through-slot 84 is formed in fence base portion 31, and is sized to closely match the outer diameter of bolt 53, and permits the fence base portion 31 to be pivoted about the bolt 53 closest to the fence workpiece-engaging portion 30, so that the fence workpiece-engaging portion 30 can assume any of a variety of angular positions, which positions are indicated by pointer 80 and indicia 82. The bolts thus maintain annular through-slot 84 in juxtaposition to the fence through-slot (work surface slot 32).

Figure 13A:
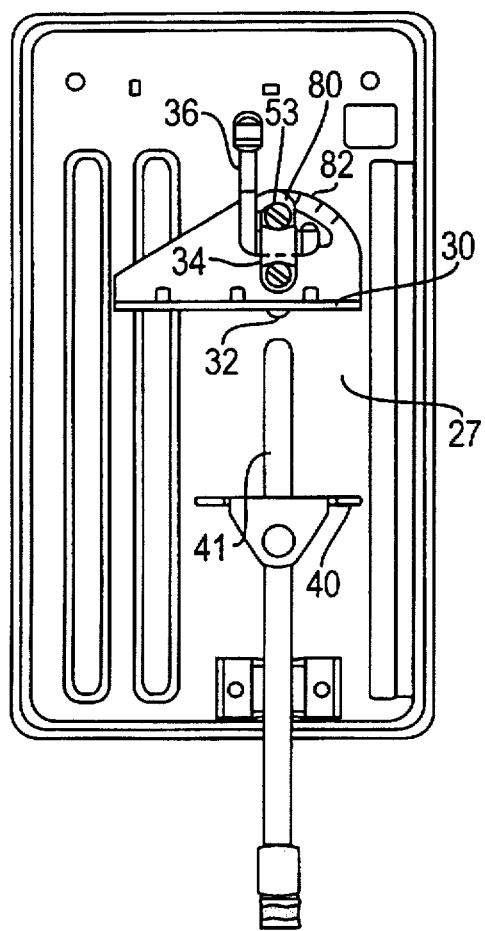
FIGS. 13a, 13b, 13c, 13d and 13e are top plan views, with the rest of the saw apparatus removed for clarity, illustrating the use of the fence and vise of the present invention for clamping workpieces, with the fence of the present invention in different locations on the workpiece support and different angular orientations relative to the saw blade (shown in phantom in FIGS. 13b and 13e).
Figure 13B:
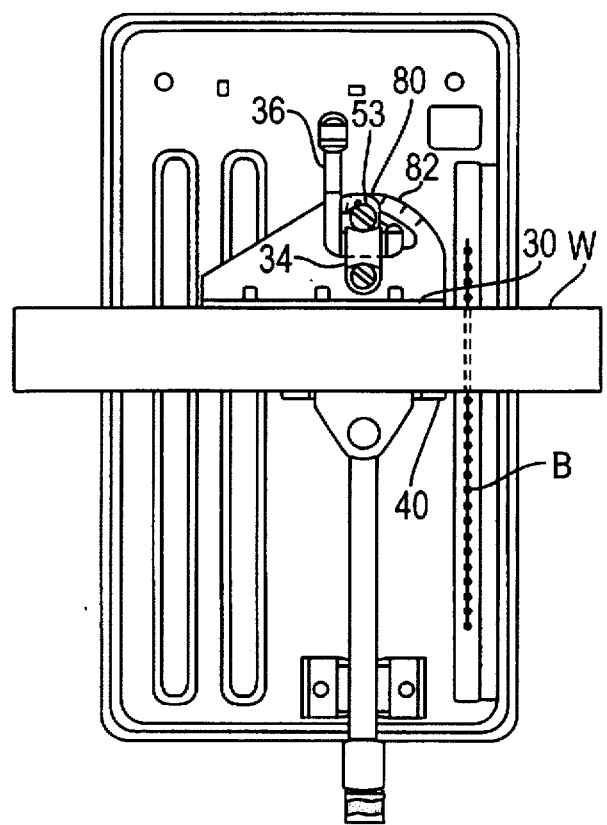
Figure 13C:
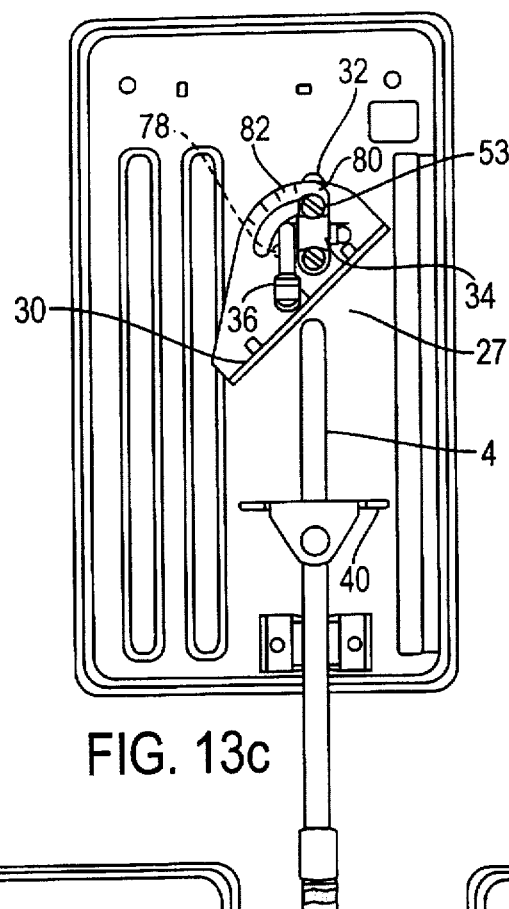
Figure 13D:
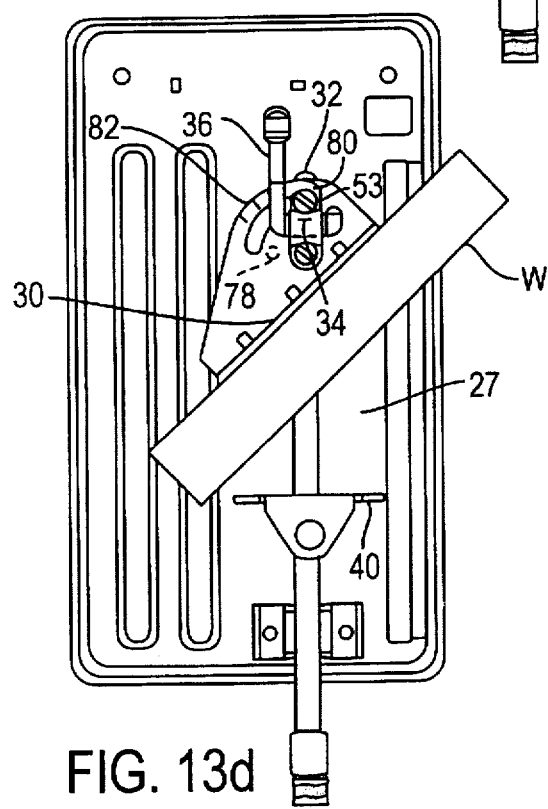
Figure 13E:
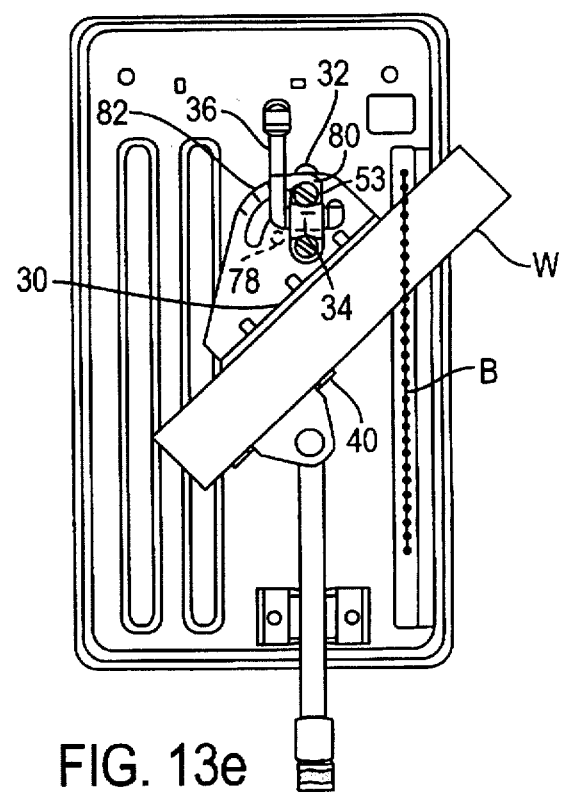

FIGS. 13a–13e illustrate the operation of the locking fence of the present invention to selectively clamp a workpiece W for various cuts by blade B (shown in phantom in FIGS. 13b and 13e). In FIG. 13a the fence workpiece-engaging portion 30 is oriented at a particular angular orientation (90°) relative to the saw blade B (in phantom in FIG. 13b) and is in a predetermined location on the workpiece support 27, and locked in place. In FIG. 13b, a workpiece W (for example, a length of pipe) has been placed against the fence workpiece-engaging portion 30 and the vise jaw 40 advanced to clamp the workpiece in place. When it is desired to change either the angular orientation or the location on the workpiece support 27 of the fence workpiece-engaging portion 30, or both, the operator moves the actuator 36 to its unlocked, or second, position, as shown in FIG. 13c. Here the angular orientation of the fence workpiece-engaging portion 30 has been changed to 45°, and its location on the workpiece support 27 has been advanced toward the vise jaw 40. Then the actuator 36 is rotated to lock the fence subassembly 28 in place, and the workpiece W is placed on the workpiece support 27 against the fence, as shown in FIG. 13d. FIG. 13e illustrates the completion of the clamping, the vise jaw 40 having been advanced and swivelled into engagement with the workpiece W.

Thus is shown a method for locking a fence for a power tool simultaneously in both an angular orientation relative to a cutting blade and in a predetermined position on the workpiece support of the power tool base, or work surface.

The above described embodiments, of course, are not to be construed as limiting the breadth of the present invention. Modifications, and other alternative constructions, will be apparent which are within the spirit and scope of the invention as defined in the appended claims.

What is claimed is:

1. A power tool comprising:
   a base including a workpiece support, said workpiece support defining a through-slot;
   a motor and working implement operatively mounted on said base, said motor driving said working implement for cutting a workpiece placed on said base;
   a fence connected to the base and having a workpiece-engaging portion selectively adjusted to both a selected angular orientation and a selected location on said base relative to the working implement, said fence including a base portion moveable in both location and angular orientation on the workpiece support;
   cam-operated locking means operatively associated with the fence base portion and the through-slot for simultaneously locking the workpiece-engaging portion in both the selected angular orientation and the selected location;
   wherein the cam-operated locking means includes;
      a first clamping member above the fence base portion,
      a second clamping member beneath the workpiece support, said second clamping member including a slot follower slideably engaging the through-slot, whereby the location of the fence on the workpiece support is guided by the through-slot,
      an actuator disposed between the fence base portion and the first clamping member and moveable from a first, unlocking position to a second, locking position,
      fastening means for connecting the first clamping member to the second clamping member through the fence base portion and the through-slot so that the fence is locked to the workpiece support when the actuator is moved to the second position, and
      detent means for holding the fence workpiece-engaging portion at one of said selected angular orientations on the workpiece support to provide a desired angular relationship relative to the working implement.

2. The power tool claimed in claim 1, wherein the detent means includes a detent member slideably mounted in the second clamping member and selectively engageable with any one of an arcuate array of detent depressions formed in the underside of the fence base portion, and means for normally biasing the detent member into engagement with a respective detent depression.

3. The power tool claimed in claim 2, wherein:
   the slot follower includes a raised portion formed on the second clamping member and configured to be slideably moveable in, and guided by, the fence slot; and
   the fastening means and the detent member being located in the raised portion of the second clamping member.

4. The power tool claimed in claim 1, further comprising vise means for clamping the workpiece against said workpiece-engaging portion of said fence.

5. A power tool comprising:
   a base including a workpiece support, said workpiece support defining a through-slot;
   a motor and working implement operatively mounted on said base, said motor driving said working implement for cutting a workpiece placed on said base;
   a fence connected to the base and having a workpiece-engaging portion selectively adjustable to both a selected angular orientation and a selected location on said base relative to the working implement, said fence including a base portion moveable in both location and angular orientation on the workpiece support;

cam-operated locking means operatively associated with the fence base portion and the through-slot for simultaneously locking the workpiece-engaging portion in both the selected angular orientation and the selected location;

the cam-operated locking means including a first clamping member above the fence base portion, a second clamping member beneath the workpiece support, an actuator disposed between the fence base portion and the first clamping member and moveable from a first unlocking position to a second locking position, and fastening means for connecting the first clamping member to the second clamping member through the fence base portion and the through-slot so that the fence is locked to the workpiece support when the actuator is moved to the second position;

wherein the actuator includes an arm portion for moving the actuator to the first and second positions and a cam portion sandwiched between and engaging with the first clamping member and the fence base portion;

the fastening means including two fasteners connecting the first clamping member to the second clamping member;

the actuator cam portion being located intermediate the two fasteners;

whereby moving of the actuator arm portion from its first position so that the actuator moves to its second position cams the first locking member away from the work support, thereby forcing the actuator into clamping engagement with the fence base portion and the second member into engagement with the workpiece support.

6. The power tool claimed in claim 5, wherein:

the first clamping member has two lateral edges;

the actuator further includes locating means adjacent the cam portion and operatively associated with the clamping member lateral edges for maintaining the actuator in alignment with the first clamping member.

7. The power tool claimed in claim 5, further comprising vise means for clamping the workpiece against said workpiece-engaging portion of said fence.

8. The power tool claimed in claim 5, further comprising detent means for selectively holding the fence workpiece-engaging portion at one of said selected angular orientations on the workpiece support relative to the working implement.

9. The power tool claimed in claim 8, wherein the detent means includes a detent member slideably mounted in the second clamping member and releasably engaging a selected one of an arcuate array of detent depressions formed in the underside of the fence base portion, and means for normally biasing the detent member into engagement with the selected detent depression.

10. A method of using an adjustable fence on a work surface, comprising the steps of:

providing an arcuate slot in the fence and a slot in the work surface;

maintaining the arcuate fence slot in juxtaposition to the work surface slot by providing at least one member linking the arcuate fence slot and the work surface slot;

guiding the fence via said slot in the work surface to a selected location on the work surface by moving the linking member along said work surface slot;

adjusting the angular orientation of the fence on the work surface by moving the linking member along said arcuate slot in the fence;

providing an actuator which is operatively associated with the linking member and the fence; and clamping the fence to the work surface simultaneously in said selected location and in a selected angular orientation by moving said actuator to a locking position, thereby locking the fence in both its predetermined location and its angular orientation.

11. A fence system on a power tool having a work surface, comprising:

a fence member movably supported on the work surface and defining an arcuate slot means for enabling adjustment of the angular orientation of the fence member on the work surface;

guiding means formed in the work surface for enabling the fence to be guided along a predetermined path to a selected location on the work surface;

means for linking the arcuate fence slot means to the guiding means; and means, operatively associated with the means for linking, for simultaneously locking the fence in both its adjusted angular orientation and in its selected location on the work surface.

12. A fence system on a work surface, comprising:

a fence member having a base portion, and an arcuate slot in said base portion;

the work surface having an underside, and a guiding slot in said work surface;

an actuator engaging the base portion and moveable from an unlocking position to a locking position;

a first clamping member engaging the actuator;

a second clamping member releasably engaging the underside of the work surface; and linking means operatively associated with the arcuate slot and the guiding slot and connecting the first clamping member to the second clamping member, wherein movement of the actuator to the locking position simultaneously forces the first clamping member away from the base portion and the second clamping member against the underside of the work surface to lock the fence base portion in a selected location and angular orientation on the work surface.

\* \* \* \* \*